United States Patent

Rippel

[15] 3,641,364

[45] Feb. 8, 1972

[54] SCR CHOPPER CIRCUIT

[72] Inventor: Wally E. Rippel, Ithaca, N.Y.

[73] Assignee: Electric Fuel Propulsion, Incorporated, Ferndale, Mich.

[22] Filed: July 18, 1969

[21] Appl. No.: 843,032

[52] U.S. Cl. ........................307/240, 307/252 J, 307/252 M

[51] Int. Cl. ........................H03k 17/00

[58] Field of Search ..................307/252.51, 252.53, 252.55, 307/240

[56] References Cited

UNITED STATES PATENTS 3,479,533 11/1969 Harris et al. ........................307/252 X

*Primary Examiner*—Donald D. Forrer
*Assistant Examiner*—John Zazworsky
*Attorney*—Cushman, Darby & Cushman

[57] ABSTRACT

An electrical circuit for controlling the energy supplied to a load from an energy source whereby an electronic switch such as an SCR which conducts the energy from the source to the load is driven alternately into nonconduction and conduction. Connected to the electronic switch are the secondary of a transformer and a diode whose turnoff time exceeds the turnoff time of the electronic switch. When a pulse of a given polarity is supplied to the primary of the transformer, then the diode begins conducting current so that when a pulse of the opposite polarity appears across the secondary of the transformer, the diode conducts current in the reverse direction, thus reverse biasing the electronic switch. When the diode recovers, recovery of the electronic switch also takes place.

22 Claims, 5 Drawing Figures

INVENTOR
WALLY E. RIPPEL

BY
Cushman, Darby & Cushman
ATTORNEYS

INVENTOR
WALLY E. KIPPEL

BY
Cushman, Darby & Cushman
ATTORNEYS

SCR CHOPPER CIRCUIT

BRIEF DESCRIPTION OF THE PRIOR ART AND SUMMARY OF THE INVENTION

The invention relates to an electrical circuit for controlling the energy applied to a load from an energy source.

Unfortunately, the amount of electrical energy and signal patterns available for example, from conventional energy sources do not always correspond to the exact pattern or signal required for a given application. Innumerable types and varieties of electrical circuits have, since the beginning of wide-spread use of electricity, been used to convert one type of electrical signal to another type of signal. This invention relates to one such signal converting and energy controlling circuit.

One problem frequently encountered in electrical applications is that the energy source available supplies more energy at least during part of a cycle than can be used by a given load. Another problem is that many electrical loads require a varying signal which at least approximates a sinusoidal wave in situations where direct current sources are either the only sources available or are preferable for one reason or the other. One solution to both of these problems is to commutate the voltage produced by an electrical direct current source into a substantially square wave signal which is then applied to the load.

Innumerable circuits for accomplishing this commutation have been proposed in the past, many especially designed to deal with particular difficulties arising from employing certain types of loads and sources. Before solid-state electronic switches were available, relays and similar mechanical devices which were alternately opened and closed were frequently employed to commutate a direct current voltage. However, the disadvantages of mechanical relays are well known and include slowness of operation, lack of economy and unacceptable weight and bulk. When solid-state switches became available, they were quickly adapted for use in such circuits. One of the many solid-state switching devices available, the SCR and its relatives have rapidly gained acceptance in high-power applications, because of their high voltage and current ratings, high reliability, and relatively low cost. Unfortunately, none of these devices readily lend themselves to DC applications, since turnoff must be accomplished by an external commutation circuit. Thus far, the two most commonly used commutation schemes use either transistors or a capacitor as the key commutation components. As discussed below, this invention relates to a third scheme, termed "diode commutation," which uses a long recovery time diode as the key element in the commutation circuit.

There are a nearly infinite number of ways in which a capacitor can be used for commutating an electronic switch, such as an SCR, but in virtually all of these capacitor commutation circuits the capacitor is charged by one portion of the circuit and, when the switch is to be turned off, another part of the circuit shunts the capacitor across part of the SCR circuit so as to reverse bias the SCR or other electronic switch for a time interval, whereby a forward blocking condition may be regained. There are a number of possible ways to charge the capacitor and these include resistive and inductive charging. While resistive charging is especially simple since the capacitor is simply charged from a fixed voltage source through a fixed resistance, charging is inefficient since a great deal of power is dissipated in the resistor and accordingly in applications where the conservation of power is important, this arrangement is unsatisfactory. Alternatively, the capacitor can be charged through an inductance or a resonant circuit and in practical systems the capacitor charges to about 80 percent of its theoretical limit with the remaining energy being permanently lost. One of the major problems of inductive charging is that a time interval $\pi\sqrt{LC}$ is required for the capacitance to be completely charged. In many applications, this unduly limits the duty cycle and even where moderately short conduction intervals are required, the inductance must necessarily be quite small, thus demanding a small Q with a resultant decrease in efficiency of the commutation circuit.

After the capacitor is charged in capacitor commutation circuits, it must be shunted across the SCR or other switch at the appropriate time to drive it into conduction or nonconduction. In virtually all capacitive commutation SCR systems, a second SCR or set of SCR's is used to either discharge the capacitor directly across the main SCR or across the load. The advantage of the double SCR arrangement is primarily its inexpensiveness and economical operation, since the second SCR need have only about a quarter or so of the RMS current rating of the first SCR and rapid turnoff characteristics are not necessary. However, this dual SCR arrangement is subject to frequent premature firing from stray firing pulses which too often cause the circuit to lock up.

Capacitor commutation schemes in general thus have a number of definite and substantial drawbacks which have encouraged the search for a better scheme. For example, if the capacitor fails to provide turnoff at any instant, turnoff thereafter is often impossible and the circuit remains "hung up" until power is turned off. Further, as the load increases the required turnoff time of the SCR also increases. Also, with higher load currents, the capacitor discharges faster so that, in order to insure turnoff under maximum load conditions, a relatively large value of capacitance and charge voltage must be used. Besides increasing cost and weight in applications where both may be vital, this increase in capacitance also tends to reduce efficiency at light loads since the amount of energy wasted for each charging of the capacitor tends to remain substantially constant. Although a large value of capacitance is not absolutely necessary, especially in lightweight systems, even a small capacitance may weigh more than all of the other components in the circuit combined. Even further, capacitors are relatively expensive compared to other components of the circuit and, if the capacitor is especially designed to be light weight, cost rises far above the practical benefits derived from a capacitor operated circuit. The capacitor itself often is the weak link in the system and frequently fails, thus substantially reducing the reliability of the whole circuit. Oscillating electrical and magnetic stresses within the capacitor often cause it to produce noise and vibrations in environments where neither is desirable. For these reasons, and others, conventional capacitor commutation arrangements while useful have not found ready acceptance for many applications.

Transistor commutation involves driving a transistor connected across an electronic switch, such as an SCR, into either saturation or nonconduction to periodically turn off the switch, such as an SCR. This type of commutation has solved many of the problems associated with the capacitive circuits but has presented additional problems which have not been completely solved. In the transistor-type commutation, commutation losses are kept quite small since the commutation energy is usually small due to the fact that the transistor can be switched with only a few volts and since the commutation pulse is substantially rectangular rather than triangular as usually results from a capacitor operated arrangement. Thus, only a small percentage of the commutation pulse energy is wasted due to hysteresis losses in the load. The losses in the transistors are, of course, small also and in the event of inadequate base drive for the transistor, the average power expended on the transistors will usually not exceed their ratings since the corresponding duty cycles are generally quite small.

The major difficulty with transistor commutation, however, is the excessive current-voltage requirement for the transistors especially when high voltages are involved. In order to handle several hundred amperes of current, a number of transistors must be connected in parallel and the current divided among them. This current division in turn leads to balancing problems which can be resolved only by adding expensive circuitry and improving the quality of the transistors used, with a consequential rise in the cost of the circuit. At the present state of the art, transistors which can be practically employed are not capable of withstanding much more than about 100 volts so that to commutate current through a high-voltage SCR application, a bank of transistors connected in series is needed. This arrangement, however, normally requires zener protection and a more complicated base drive circuit for the transistors. These additional complications have severely limited the spread of transistor commutation circuits.

The present invention relates to a commutation arrangement, termed diode commutation, which retains most of the advantages of the transistor scheme while at the same time eliminating the extreme complexity resulting from the use of transistor banks and reducing the cost of the overall circuit. When an SCR is used for the electronic switch, a simple circuit comprised of a specially constructed diode and the secondary winding of a transformer is connected in series from the anode to the cathode of an SCR or similar electronic switch. To drive the SCR into a state of nonconduction, a conventional driver circuit which is disclosed below produces a pulse which is transmitted to the secondary of the transformer and which then causes the diode connected in series with the secondary to begin to conduct current. This diode is especially designed to have a turnoff time which exceeds the turnoff time of the SCR, so that when the pulse turning on the diode is followed by a pulse of the opposite polarity, the current through the diode reverses and begins to flow backwards through the diode, back biasing the SCR and driving it into nonconduction. When the diode eventually recovers, cutting off the reverse current flow, the SCR reverts to its nonconductive state. Thus, the turnoff of the SCR is not dependent on the charging of a capacitor, or in any way on the past electrical history of the SCR. Even further, the driver supplying the pulses to the transformer need only deliver moderate currents and block only moderate voltages over a small duty cycle. Thus, lightweight, economic transistors can be employed. Further, because the commutation voltage across the SCR is smaller in magnitude and rectangular rather than triangular, hysteresis losses in the load as a result of commutation are substantially reduced and the efficiency of the entire circuit over previous circuits as discussed above is considerably improved.

Other objects and purposes of the invention will become clear from the following detailed description of the drawings.

DETAILED DESCRIPTION OF THE DRAWINGS

Figure 1:
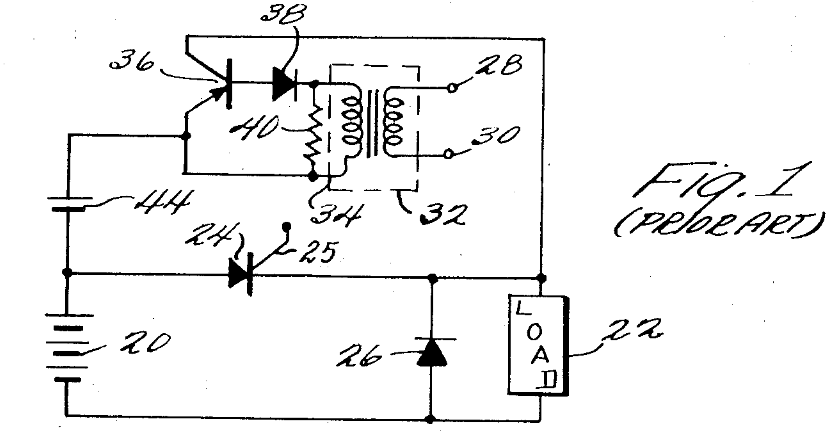
FIG. 1 (PRIOR ART)
FIG. 1 shows a transistor commutation circuit of the prior art.

Reference is now made to FIG. 1 which shows a transistor commutation circuit which is typical of those employed in the prior art. In this arrangement, a DC source 20 supplies energy to a load 22, which may be any load for any given application, via an electronic switch which in this embodiment is an SCR 24. SCR 24 is turned on by driving its gate 25 positive relative to its cathode.

To drive the SCR 24 into a state of nonconduction, a positive pulse of electrical energy is applied across the terminals 28 and 30 of transformer 32 so that the pulse appears across the secondary coil 34 of transformer 32, either increased in voltage and decreased in current amplitude, or vice versa. The secondary coil 34 of transistor 32 is connected between the base and emitter of conventional transistor 36 via a diode 38 and resistor 40 in a conventional manner. When a pulse appears across the secondary coil 34 of transformer 32, the transistor 36 is driven from its normal state of nonconduction toward saturation and accordingly current begins to flow from the small battery 44 through transistor 36 toward the cathode of SCR 24. Thus, the anode voltage of SCR 24 falls below the cathode voltage and accordingly SCR 24 is driven into nonconduction until transistor 36 resumes its normal nonconductive state cutting off the flow of current from source 44. This return to nonconduction for transistor 36 results shortly after the exciting voltage ceases to be applied to the terminals 28 and 30. Diode 26 is the conventional bypass diode which carries inductive load currents that continue flowing after SCR 24 has been commutated off.

As pointed out above, this arrangement has a number of advantages over capacitive systems which preceded it. Since the commutation pulse is rectangular rather than triangular, the amount of commutation pulse energy wasted due to eddy losses in the load is substantially reduced, and the commutation energy is kept small since the voltage source 44 need be only a few volts. Transistor losses are necessarily small as well. If the collector-emitter voltage of transistor 36 during saturation is kept to roughly half a volt, the current during commutation of 200 amps, the turnoff time of the SCR to 50 microseconds, the switching time of the transistor to a microsecond and the voltages across sources 20 and 44 are 100 and 10 volts, respectively, then the transistor losses can be calculated to be roughly 6½ watts, which is well within acceptable values.

Figure 2:
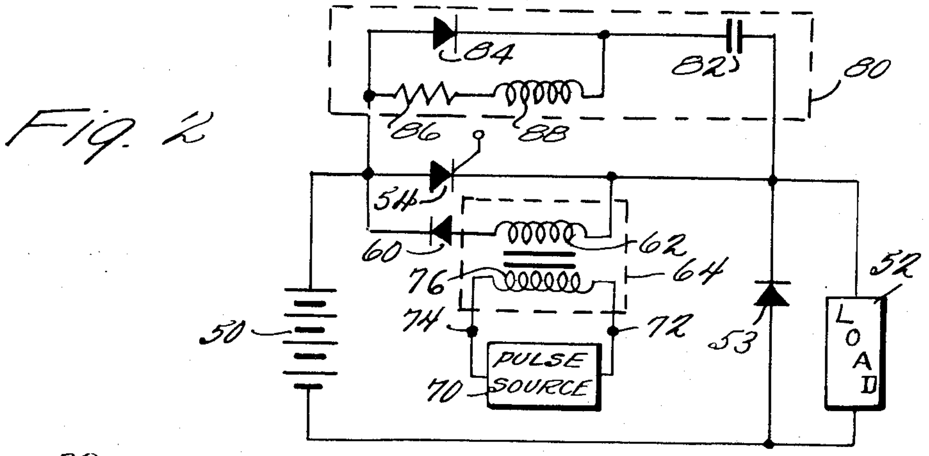
FIG. 2 shows a diode commutation arrangement of this invention.

Reference is now made to FIG. 2 which shows the novel diode commutation circuit of the present invention. As discussed above, this unique circuit retains most of the advantages discussed above of the transistor scheme while eliminating the unwieldy and expensive transistor banks usually required in high-voltage situations. In FIG. 2, a source of voltage 50 supplies electrical energy to a load 52 across which is also connected a diode 53 which serves to protect against transients by carrying inductive load currents that flow after SCR 54 has been commutated off. The energy from the source 50 flows to the load 52 through an SCR 54 or other conventional switch which is turned periodically off to commutate the voltage, the SCR being conventionally driven on via its gate 55 as explained above relative to FIG. 1.

Figures 3, 4:
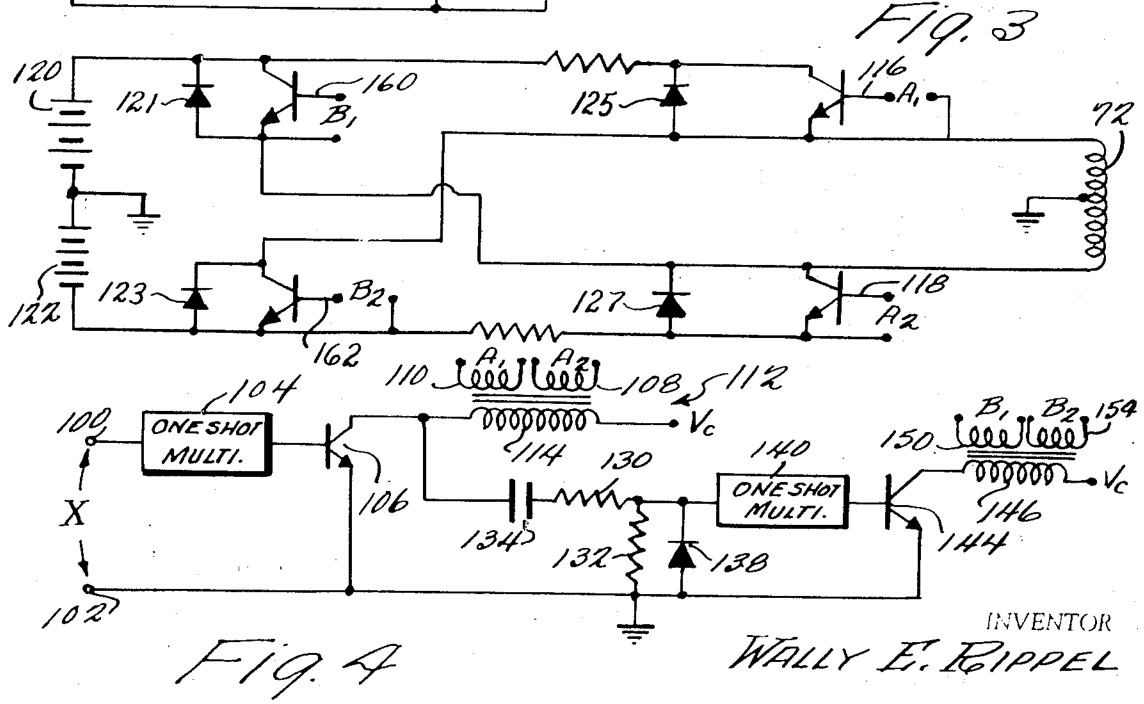
FIG. 3 shows a portion of the driver circuit for the diode commutation circuit of FIG. 2.
FIG. 4 shows another portion of the drive circuit for the diode commutation circuit of FIG. 2.

A diode 60 connected in series with the secondary 62 of a transformer 64 actually switches the SCR off to accomplish the commutating function. As discussed in greater detail below, a driver circuit 70 of which one particular embodiment is shown in FIGS. 3 and 4, first supplies an electrical pulse to the terminals 72 and 74 of primary coil 76 of transformer 74 so that terminal 74 exceeds terminal 72 in voltage. This current pulse then induces another pulse in the secondary coil 62 of transformer 74, the turns ratio of the transformer 64 being such that the current is increased and the voltage decreased as discussed in greater detail below. This positive pulse of voltage in coil 62 then causes current to flow through the diode 60 in the conventional forward fashion from the anode of diode 60 toward the cathode and causes the diode 60 to be quickly driven from its nonconductive to its conductive state.

Further, as discussed in greater detail below, this diode 60 is designed to have a turnoff time, i.e., the time required for the diode 60 to cut off conduction in the reverse direction through itself after the current through it is reversed so that the cathode voltage exceeds the anode voltage, which exceeds the turnoff time of the SCR 54. Accordingly, when the positive pulse which drove the diode 60 into conduction is followed by a negative opposing pulse which raises the voltage at terminal 72 above the voltage at terminal 74, this pulse is also reproduced in the secondary coil 62 and current begins to flow backward through the diode 60 raising the cathode of the SCR 54 above its anode voltage. Before the diode 60 turns itself off, cutting off the reverse conduction, the SCR 54 has been driven into nonconduction and current ceases flowing through SCR 54 to the load 52, thus commutating the voltage from the source 50. When the diode 60 returns to its nonconductive state or the negative pulse ceases being applied to terminals 72 and 74, SCR 54 returns to its normal nonconductive state. Then it may be put into its conductive state when gated on and energy resumes flowing through the load 52. This cycle is periodically repeated to produce a roughly square or rectangular wave voltage which is then applied to load 52.

In the embodiment of FIG. 2, a transient suppression circuit 80 is also provided to limit the rate at which the forward voltage across the SCR can change (rise) so as to protect the SCR against damage. If the diode 60 is constructed to have doping gradients which are sufficiently low as discussed below, then a "snapoff" characteristic may result which may exceed the *dv/dt* rating of the SCR. This suppression circuit guards against such a possibility and consists simply of capacitor 82, which may have a value of just a few microfarads, diode 84, resistor 86, and inductor 88.

As mentioned above, the recovery or turnoff time of diode 60, must exceed the turnoff time of SCR 54 under maximum load conditions. This may be accomplished in a variety of ways, for example by making the forward current $I_F$ and a variable $\mu$, which is a time constant approximately equal to the minority carrier lifetime of the material of lowest doping concentration, large enough so that the recovery or turnoff time $T_s$ when conducting a reverse current $I_R$ exceeds the turnoff time of SCR 54. The time $T_s$ is roughly governed by the relation:

$$Erf\ \sqrt{T_s/\mu}=I_F/(I_F+I_R)$$

Since $\mu$ is equal roughly to $\mu_p$, the minority carrier lifetime in the *p* material in diodes where the *p* doping concentration is much less than *n* doping concentration, and $\mu=\mu_n$ in the case of reverse asymmetry, it is thus desirable to optimize either $\mu_p$ or $\mu_n$.

Optimizing minority carrier lifetimes can be accomplished in a variety of ways. For example, in germanium and silicon junctions, the recombination mechanisms are believed to be mostly impurities present within the crystal, such impurities including the doping impurities and other, nonionizing species. In addition, lattice imperfections of all types serve as recombination centers for minority and majority carriers. Thus, to optimize minority carrier lifetimes, the undoped germanium and silicon material should be of optimum purity with a minimum of defects. Secondly, doping should be as light as possible, consistent with the other desired characteristics, such as conductivity. In most diodes being manufactured today, minimal not maximal values of $\mu_p$ and $\mu_n$ are desired. Accordingly, various nonionizing impurities are purposefully added to "catalyze" recombination processes, and these impurities would be undesirable for a diode such as the diode 60 in FIG. 2.

Further, the conditions under which the above relation gives the approximate recovery time $T_s$ assume that the length of both the *p* and *n* regions are long, compared with their respective diffusion lengths. It is also desirable to insure that the total charge availed by the doping is larger than the maximum load current times the maximum turnoff time of the SCR. These two conditions imply both a minimal acceptable length and volume for both the *p* and *n* materials, relative to their respective doping concentrations and minority carrier lifetimes.

The length of the *p* and *n* regions must also be limited so as to prevent excessive $I^2R$ electrical losses, and at the same time provide adequate heat conductivity from the junction. Of course, both the electrical and thermal conductivities are in proportion to the junction cross sections with the usual practical limits as to the maximum junction area.

Further, if doping gradients are sufficiently low in a diode such as diode 60, so called snapoff characteristics will result. As mentioned above, this feature, while desirable from the heating point of view, may present problems to the SCR because of the sudden change in the voltage across it. The suppression circuit 80 can be useful in protecting an SCR or similar switch against such problems.

In designing a given circuit with a diode 60 with a certain set of characteristics, both the magnitude of the forward current $I_F$ and its duration time $T_2$ must be sufficient since these factors also bear on the recovery time as discussed above. The above equation relating recovery time $T_s$ to the other various factors applies only to situations where the forward current has been flowing for a time long compared with $\mu$. From experimental data, it appears that when the duration time of the forward current is roughly equal to $\mu$, the actual recovery time is between 0.8 and 0.9 of the theoretical recovery time. Accordingly, in the design of a circuit, it is desirable to choose a forward current $I_F$ and its duration time $T_2$ judiciously so as to minimize commutation losses and transformer weight.

The voltage across the transformer 64 preferably has an average time value of zero. The drive signal, unfortunately, will not generally meet this requirement, so that diodes 121, 123, 125 and 127 are preferably placed across the drive transistors as in FIG. 3. The simplest way of driving the pulse transformers is with power transistors which, because of short duty cycles, need very little heat sinking. These transistors which then provide both the forward and reverse current pulses have series resistance added so as to approximate a current source, rather than a voltage source.

Reference is now made to FIGS. 3 and 4 which show a drive circuit suitable for producing the forward and reverse pulses for turning the SCR on and off. Transformer outputs $A_1$, $A_2$, $B_1$ and $B_2$ of FIG. 4 connect respectively to the same lettered inputs of FIG. 3. First, a suitable pulse is applied across the terminals 100 and 102 and this pulse is labeled X in FIG. 4. Such a pulse drive turns on the one-shot multivibrator 104 which responds by driving the transistor 106 into conduction. The passage of current through the transistor 106 as it enters conduction induces pulses in the two secondary coils 108 and 110 of transformer 112, of which the primary coil 114 is connected between the source $V_c$ and ground through transistor 106. The pulse induced in secondary coil 110 the output of which is labeled $A_1$ in FIGS. 3 and 4 is then applied between the base and emitter of transistor 116 in FIG. 3, driving that transistor into conduction. Likewise, the pulse induced in coil 108 drives transistor 118 into conduction. Thus, voltages 120 and 122 are connected across the primary 76 of transformer 64 of FIG. 2 via now-conducting transistors 116 and 118 to provide the positive pulse discussed above to turn on diode 60.

Then one-shot multivibrator 104 turns itself off and the current flowing through transistor 106 drops rapidly producing an inductive surge, because of coil 114, which is passed through a differentiating circuit comprised of resistors 130 and 132 and capacitor 134. A diode 138 is also provided across resistor 132 to prevent current from flowing backwards through the system. This inductive surge, sharpened by the differentiating circuit, causes one-shot multivibrator 140 to produce another pulse of a given duration which causes transistor 144 to be driven into conduction thus permitting current to flow through coil 146 from source $V_c$ in turn inducing voltages in coils 150 and 154 which are inductively coupled to coil 146. These voltages induced in coils 150 and 154 in turn, turn on the transistors 160 and 162 shown in FIG. 3. Turning on these transistors connects the voltages 120 and 122 again across the primary coil 72 but exactly opposite to the connection before so that an equal and opposite pulse to the original pulse is produced which then turns the SCR off in the manner described above. It will be appreciated that the simple driving circuit shown in FIGS. 3 and 4 is just one possible driving circuit which can be used with novel commutation circuit of this invention and many other driving circuits can undoubtably be employed with satisfactory results.

Figure 5:
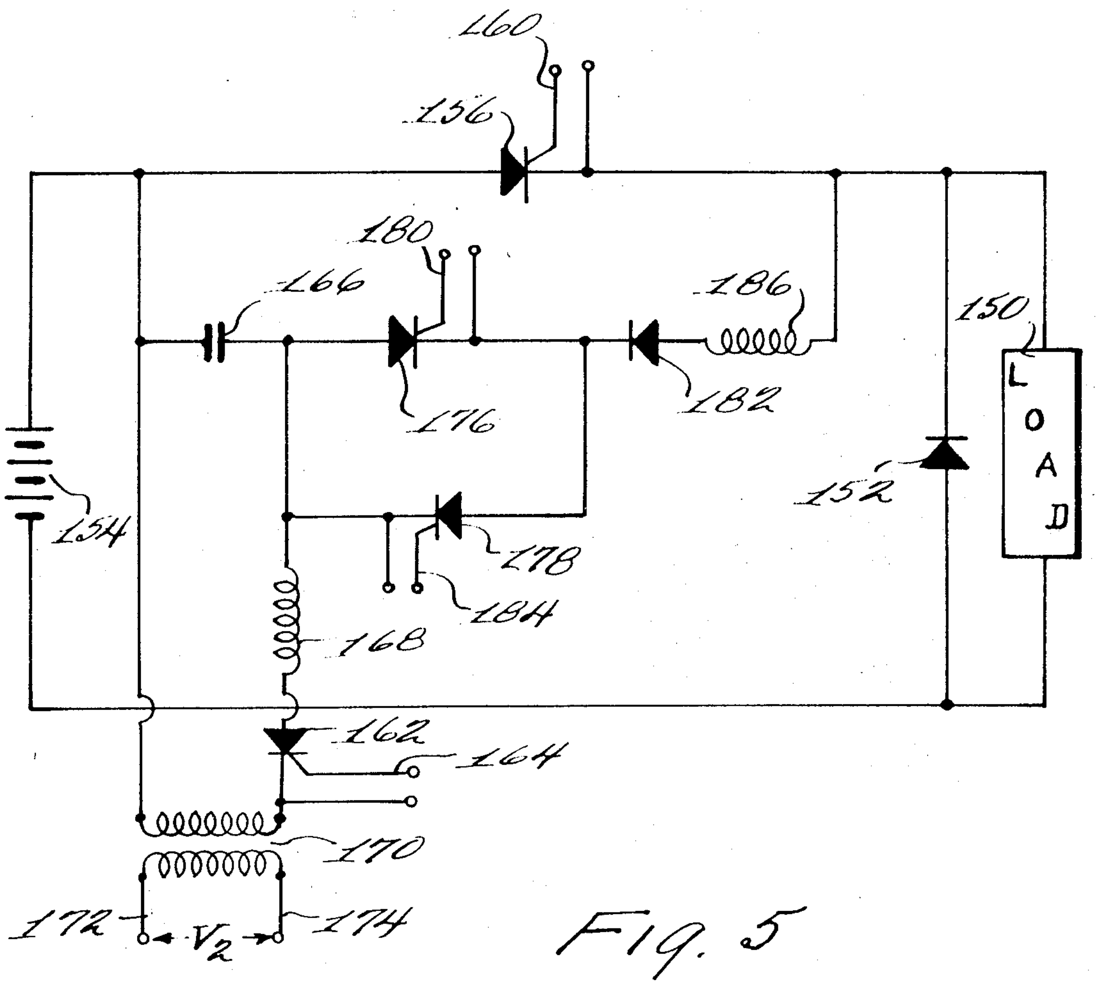
FIG. 5 shows another embodiment of the invention.

FIG. 5 illustrates another embodiment of the invention which also employs a long recovery diode such as discussed above. As in the other embodiments, the arrangement shown in FIG. 5 first forward biases the long recovery diode 182 so that a large current flows through it in the forward direction, sweeping holes into the N region and electrons into the P region. Directly thereafter, the load current is then shunted away from an SCR or similar electronic switch and forced to flow in a reverse direction through long recovery diode 182. Since, diode 182 has a longer recovery time than necessary to turn off the SCR, the SCR is thus driven into nonconduction and commutation is complete.

As in the other embodiment discussed above, a commutated square wave voltage is applied to a suitable load 150 which has a diode 152 connected in parallel with it. The current flows from a conventional voltage source 154 to the load 150 through SCR 156 which is turned on and off as described above to produce the square wave voltage. Unlike the embodiment of FIGS. 1–4 as described above, an alternating current $V_2$ is employed to control the commutation, but it should be understood that any other suitable source of pulses or alternating current can be alternatively employed as the controlling source. Other auxiliary circuitry such as the suppressing circuit shown in FIG. 2 can also be used with the embodiment of FIG. 5.

The SCR 156 is turned on by the conventional application of a suitable biasing voltage to the gate 160, and, when the SCR 156 assumes its conductive state, current begins to flow through SCR 156 to the load 150. When it is desired to turn off the SCR 156 and to thus interrupt the flow of current to the load 150, the SCR 162 is turned on by the application of a proper voltage to its gate 164, and current begins to flow through the capacitor 166 via inductance 168, and the SCR 162. A pulse transformer 170 is normally provided to couple the voltage source $V_2$ attached to lines 172 and 174 to the capacitor 166 to provide a suitable amount of current as discussed in detail above.

The capacitance 166 thus charges during positive excursions of the voltage source $V_2$ attached to lines 172 and 174, and capacitor 166 is chosen to have a value so as to normally charge completely during the positive half of the cycle. When capacitor 166 is fully charged, the SCR's 176 and 178 can be fired by suitable applications of voltage pulses to the gates 180 and 184, respectively. If desired, these two SCR's can be replaced by a suitable bidirectional current switch, commonly known as a TRIAC. After the two SCR's 176 and 178 are turned on, the current begins to flow forwards through the SCR 178 through the inductance 186, and diode 182 which is of the long recovery type discussed above. Thus, current now flows through the diode 182 in the forward direction, sweeping electrons and holes into the P and N regions, respectively.

However, shortly thereafter, because of the action of the capacitor 166 and inductance 186, this current direction is reversed, and current then flows backwards through the diode 182 via SCR 176. This current, if sufficiently large, will then cause the SCR 156 to be reversed biased and that device will then assume its nonconductive state as discussed in detail above. The diode 182 is especially designed to have a recovery time which exceeds the time necessary to turn off the SCR 156, and after SCR 156 assumes its nonconductive state, diode 182 will thereafter recover and return to its blocking state. The SCR 156 then can again be fired and the above steps repeated, thus producing a square wave commutated voltage.

The arrangement shown in FIG. 5 is particularly suited where moderate frequency AC voltages are available, such as is commonly the case in electrical vehicles where 1 kilocycle power would possibly be used to run power supplies and auxiliary electrical systems. Further, the arrangement shown in FIG. 5 overcomes one drawback of the arrangement shown in FIGS. 2–4, in that the inherent leakage inductance in the secondary of the pulse transformer therein is avoided. This leakage inductance limits the rate at which the current can rise through the long recover diode in FIGS. 2–4, and this in turn limits the speed of operation of the commutation circuit, thus ruling out very small pulse widths. Furthermore, in the arrangements of the FIGS. 2–4, because of the *di/dt* limit, diode recovery time must be longer than otherwise necessary. The arrangement in FIG. 5 does not present this particular problem.

Moreover, although the arrangement shown in FIG. 5 includes a capacitor 166 which was one of the drawbacks of the prior art arrangements such as discussed in detail above, this disadvantage is not as substantial, as in prior art devices, since the voltage on capacitor 166 is normally compared with the voltage of source 154. Accordingly, capacitor size and energy losses can be and are proportionately less than with conventional capacitor commutation schemes, and the above-;iscussed difficulties with such capacitors are not fully reproduced in the arrangement of FIG. 5.

Further, since the capacitor 166, shown in FIG. 5, is capable of driving rather large currents through the diode 182 in the forward direction, minority carrier lifetime can be considerably less than with the arrangement shown in FIGS. 2–4. This has two important advantages: (1) a standard high-voltage diode may be used for the diode 182, and (2) commutation time does not become excessive when load current becomes quite small.

Accordingly, the diode commutations circuits which have been discussed above are capable of handling voltages in excess of 200 volts and currents in excess of 200 amps with a transistor circuit capable of delivering only 20 amps and blocking 100 volts. In short, the circuit is simple; it is light weight; it is economical; it is especially satisfactory in minimizing energy losses. While it is expected that this circuit will find application in many, many areas, it is believed that the circuit will be especially useful in vehicles which operate from an electrical power source. Such vehicles do not depend upon a combustion engine and do not discharge pollutants into the atmosphere or dissipate heat and noise into the environment and their use as general transportation vehicles is increasing. In such vehicles, of course, it is essential to conserve all of the electrical energy available to lengthen the time and distances between recharging and to minimize weight. This circuit finds special utility in such vehicles.

Many modifications and changes in the above circuit will be apparent to anyone of ordinary skill in the art, and this invention is intended to be limited only by the scope of the appended claims.

What is claimed is:

1. A circuit for periodically interrupting the flow of energy from an electrical energy source through a load comprising:
   - first electrical switch means connecting said source to said load having a conductive and a nonconductive state and adapted to be shifted from said conductive to said nonconductive state,
   - a second electrical switch means having a conductive and nonconductive state and having a turnoff time exceeding the turnoff time of said first switch means, and
   - transformer means having a primary and a secondary coil, one of said coils being connected in series with said second switch means and the series connection of said one coil and said second switch means being connected across said first switch means so that when a first signal is applied to the other coil of said transformer said second switch means assumes a conductive state and when said first signal is followed by a second signal of opposite polarity said second switch means conducts current in the reverse direction to cause said first switch means to assume said nonconducting state.

2. A circuit as in claim 1 wherein said second switch means is a diode.

3. A circuit as in claim 2 wherein said first switch means is an SCR.

4. A circuit as in claim 1 including means to produce said first and second signals and wherein said signals are pulses.

5. A circuit as in claim 1 wherein said energy source is a DC voltage source.

6. A circuit as in claim 1 including suppression circuit means connected in parallel with the first switch means including a serially connected resistor and inductance, a diode connected in parallel with said serially connected resistor and inductance and a capacitor connected in series with said diode and said serially connected resistor and inductance.

7. A circuit as in claim 1 including a diode connected in parallel with said load.

8. A circuit for producing a substantially square wave signal from a direct current voltage comprising:

electronic switch means for receiving said direct current voltage and having a substantially conductive and a substantially nonconductive state, and means connected to said switch means for periodically shifting said switch means from said conductive to said nonconductive state and from said nonconductive to said conductive state including semiconductor means having a turnoff time greater than the turnoff time of said switch means and signal producing means for producing a first signal to cause said semiconductor means to conduct current in a forward direction and a second subsequent signal to cause said semiconductor means to conduct current in a reverse direction to cause said switch means to shift from one to the other of said states before said semiconductor means ceases conducting current in said reverse direction.

9. A circuit as in claim 8 wherein said signal-producing means includes first transformer means having a winding serially connected with said semiconductor means and said serially connected winding and said semiconductor means are connected in parallel with said switch means.

10. A circuit as in claim 9 wherein said semiconductor means is a diode.

11. A circuit as in claim 10 wherein said switch means is an SCR.

12. A circuit as in claim 11 wherein said signal-producing means further includes a pulse-producing means connected to another of the windings of said first transformer means for producing pulses to induce said first and second signals in said winding serially connected with said diode.

13. A circuit as in claim 12 wherein said pulse-producing means includes a first one-shot multivibrator adapted to produce a first pulse when a given signal is received, first transistor means connected to the output of said first multivibrator so that said first transistor means is driven into conduction by said first pulse, second transformer means connected to said first transistor means for including pulses in first and second winding when said first transistor is driven into conduction second transistor means connected to said first winding and third transistor means connected to said second winding so that said second and third transistor means are driven into conduction when said pulses are induced in said first and second windings direct current source means connected to said second and third transistors and to said another of said windings of said first transformer means so that said first signal is produced when said second and third transistors are driven into conduction, differentiating circuit means connected to said first transistor means so that when said first transistor means becomes nonconductive said second transformer means produces a signal which is passed to said differentiating means, a second one-shot multivibrator connected to said differentiating means adapted to produce a second pulse when a given signal is received from said differentiating means, fourth transistor means connected to said second multivibrator so that said fourth transistor means is driven into conduction by said second pulse, third transformer means connected to said fourth transistor means for inducing pulses in third and fourth winding when said fourth transistor is driven into conduction by said second pulse, fifth transistor means connected to said third winding and sixth transistor means connected to said fourth winding so that said fifth and sixth transistor means are driven into conduction when said pulses are induced in said third and fourth windings, said fifth and sixth transistors means being connected to said direct current source means so that said second signal is produced when said fifth and sixth transistor means are driven into conduction.

14. A method of commutating a direct current voltage connected to a load via electronic switch means having a serially connected diode with a turnoff time greater than the turnoff time of said switch means and a winding of a transformer connected in parallel with said switch means comprising the steps of:

applying a first signal to said winding to cause said diode to conduct current in a forward direction, and applying a second signal to said winding to cause said diode to conduct current in a reverse direction to cause said switch means to become nonconductive to cut off the flow of current to said load.

15. A method as in claim 14 including the steps of producing said first signal as a first pulse and producing said second signal as a second pulse of polarity opposite to said first pulse.

16. A circuit for periodically interrupting the flow of energy from an electrical energy source through a load comprising:

first electrical switch means connecting said source to said load having a conductive and a nonconductive state and adapted to be shifted from said conductive to said nonconductive state, a second electrical switch means electrically connected to said first switch means having a conductive and nonconductive state and having a turnoff time when shifting from said conductive to said nonconductive state exceeding the turnoff time of said first switch means when shifting from said conductive to said nonconductive state, and means for causing current to flow through said second switch means first in a forward direction so that said second switch means assumes said conductive state and next causing current to flow through said second switch means in a reverse direction to cause said first switch means to assume said nonconductive state before said second switch means assumes said nonconductive state.

17. A circuit for periodically interrupting the flow of energy from an electrical energy source through a load comprising:

first electrical switch means connecting said source to said load having a conductive and a nonconductive state and adapted to be shifted from said conductive and said nonconductive state, a second electrical switch means having a conductive and nonconductive state and having a turnoff time exceeding the turnoff time of said first switch means, a controlling source of alternating current, a capacitor connected to said controlling source and connected to said second switch means so that said capacitor is charged by said controlling source to cause current to flow in a forward direction through said second switch means, causing said second switch means to assume said conductive state, and an inductance connected to said second switch means so that after current flows through said second switch means in a forward direction current flows through said second switch means in a reverse direction causing said first switch means to assume a nonconductive state before said second switch means assumes a nonconductive state.

18. A circuit as in claim 17 wherein said capacitor, said second switch means, and said inductor are connected in a series combination and said combination is connected in parallel with said first switch means.

19. A circuit as in claim 18 including third switch means connected in series with said capacitor, said second switch means and said inductor.

20. A circuit as in claim 18 wherein said second switch means is a long recovery diode.

21. A circuit as in claim 18 wherein said first switching means is an SCR.

22. A circuit as in claim 18 including fourth switching means connecting said controlling source to said capacitor.

* * * * *